United States Patent
Tsujikawa et al.

(10) Patent No.: US 6,476,880 B2
(45) Date of Patent: Nov. 5, 2002

(54) PROJECTION TYPE COLOR LIQUID CRYSTAL DISPLAY APPARATUS CAPABLE OF ENHANCING OPTICAL UTILIZATION EFFICIENCY

(75) Inventors: Susumu Tsujikawa, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 26 days.

(21) Appl. No.: 09/966,602

(22) Filed: Oct. 1, 2001

(65) Prior Publication Data

US 2002/0015117 A1 Feb. 7, 2002

Related U.S. Application Data (62) Division of application No. 08/960,037, filed on Oct. 29, 1997, now Pat. No. 6,320,628.

(30) Foreign Application Priority Data

Oct. 30, 1996 (JP) .............................................. 8-288476
Feb. 5, 1997 (JP) .............................................. 9-022505

(51) Int. Cl.$^7$ ................................................. G02F 1/13
(52) U.S. Cl. .................................. 349/9; 349/8; 348/751
(58) Field of Search ........................... 349/8, 9; 348/751

(56) References Cited

U.S. PATENT DOCUMENTS

| | | | | |
|---|---|---|---|---|
| 5,387,953 A | * | 2/1995 | Minoura et al. | |
| 5,452,128 A | * | 9/1995 | Kimura | |
| 5,742,577 A | * | 4/1998 | Horimai et al. | |
| 5,815,221 A | | 9/1998 | Kojima et al. | ............... 348/751 |
| 6,067,128 A | | 5/2000 | Imai | ............................. 349/8 |

FOREIGN PATENT DOCUMENTS

| | | |
|---|---|---|
| JP | 460538 | 2/1992 |
| JP | 4340918 | 11/1992 |
| JP | 8015686 | 1/1996 |

* cited by examiner

Primary Examiner—William L. Sikes
Assistant Examiner—Julie Ngo
(74) Attorney, Agent, or Firm—Young & Thompson (57) ABSTRACT

In a projection type color liquid crystal display apparatus, a polarization conversion section receives a luminous flux from a light source to convert the luminous flux into a unified luminous flux having a single linearly-polarized direction. A color separation section receives the unified luminous flux to selectively reflect a plurality of color components of the unified luminous flux individually at different angles. Convex lenses of a microlens array converge the reflected color components into different pixels of a liquid crystal element.

4 Claims, 7 Drawing Sheets

PROJECTION TYPE COLOR LIQUID CRYSTAL DISPLAY APPARATUS CAPABLE OF ENHANCING OPTICAL UTILIZATION EFFICIENCY

This application is a division of Application Ser. No. 08/960,037, filed on Oct. 29, 1997, now U.S. Pat. No. 6,320,628, the entire contents of which are hereby incorporated by reference.

BACKGROUND OF THE INVENTION

1. Field of the Invention

The present invention relates to a projection type color liquid crystal display (LCD) apparatus used in a personal computer, a television set or a video tape recorder.

2. Description of the Related Art

A first prior art projection type color LCD apparatus includes three dichroic mirrors for selectively reflecting blue, red and green components of a luminous flux, and three LCD elements each receiving the blue, red and green components, respectively, of the luminous flux. Thus, three color images obtained by the three LCD elements are combined to obtain a color image on a screen.

In the first prior art projection type color LCD apparatus, however, since use is made of three LCD elements, the apparatus becomes expensive and large in size.

A second prior art color LCD apparatus includes a single LCD element associated with color filters such as blue, red aged green filters. Since use is made of one LCD element, the apparatus becomes inexpensive and small in size.

In the second prior art projection type color LCD apparatus, however, the optical utilization efficiency of the available light is low. That is, the blue filter passes the blue component therethrough, but the blue filter absorbs the red and green components. Also, the red filter passes the red component therethrough, but the red filter absorbs the blue and green components. Further, the green filter passes the green component therethrough, but the green filter absorbs the blue and red components. Thus, only one-third of the available light is utilized.

A third prior art projection type color LCD apparatus includes a color separation section formed by dichroic mirrors which receive a luminous flux to selectively reflect a plurality of color components of the luminous flux individually at different angles. Convex lenses of a microlens array converge the reflected color components into different pixels of an LCD element (see JP-A-4-60538). This will be explained later in detail.

Thus, in the third prior art projection type color LCD apparatus, since portions of blue, red and green luminous fluxes are selectively incident to the pixels of the LCD element, color filters are unnecessary, so that the optical utilization efficiency of the available light can be increased without the loss of light due to the color filters.

In the third prior art projection type color LCD apparatus, however, natural light is incident to a polarization plate as a polarizer, and one of the P-polarized component and the S-polarized component of the natural light is absorbed in the polarization plate, so that the optical utilization efficiency of the available light is still low. In addition, since the polarization plate is heated by the absorption of one of the P-polarized component and S-polarized component, the polarization plate is deteriorated. Further, it is difficult to adjust the angles of the dichroic mirrors, and also, the adjusted angles of the dichroic mirrors are easily deviated from each other by vibration of the apparatus.

SUMMARY OF THE INVENTION

It is an object of the present invention to enhance the optical utilization efficiency of the available light in a projection type color LCD apparatus.

Another object of the present invention is to suppress the deterioration of a polarization plate as a polarizer in a projection type color LCD apparatus.

A further object of the present invention is to provide a vibration-proof projection type color LCD apparatus.

According to the present invention, in a projection type color liquid crystal display apparatus, a polarization conversion section receives a luminous flux from a light source to convert the luminous flux into a unified luminous flux having a single linearly-polarized direction. A color separation section receives the unified luminous flux to selectively reflect a plurality of color components of the unified luminous flux individually at different angles. Convex lenses of a microlens array converge the reflected color components into different pixels of a liquid crystal element.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of the preferred embodiments, a prior art projection type color LCD apparatus will be explained with reference to FIG. 1 (see JP-A-4-60538).

Figure 1:
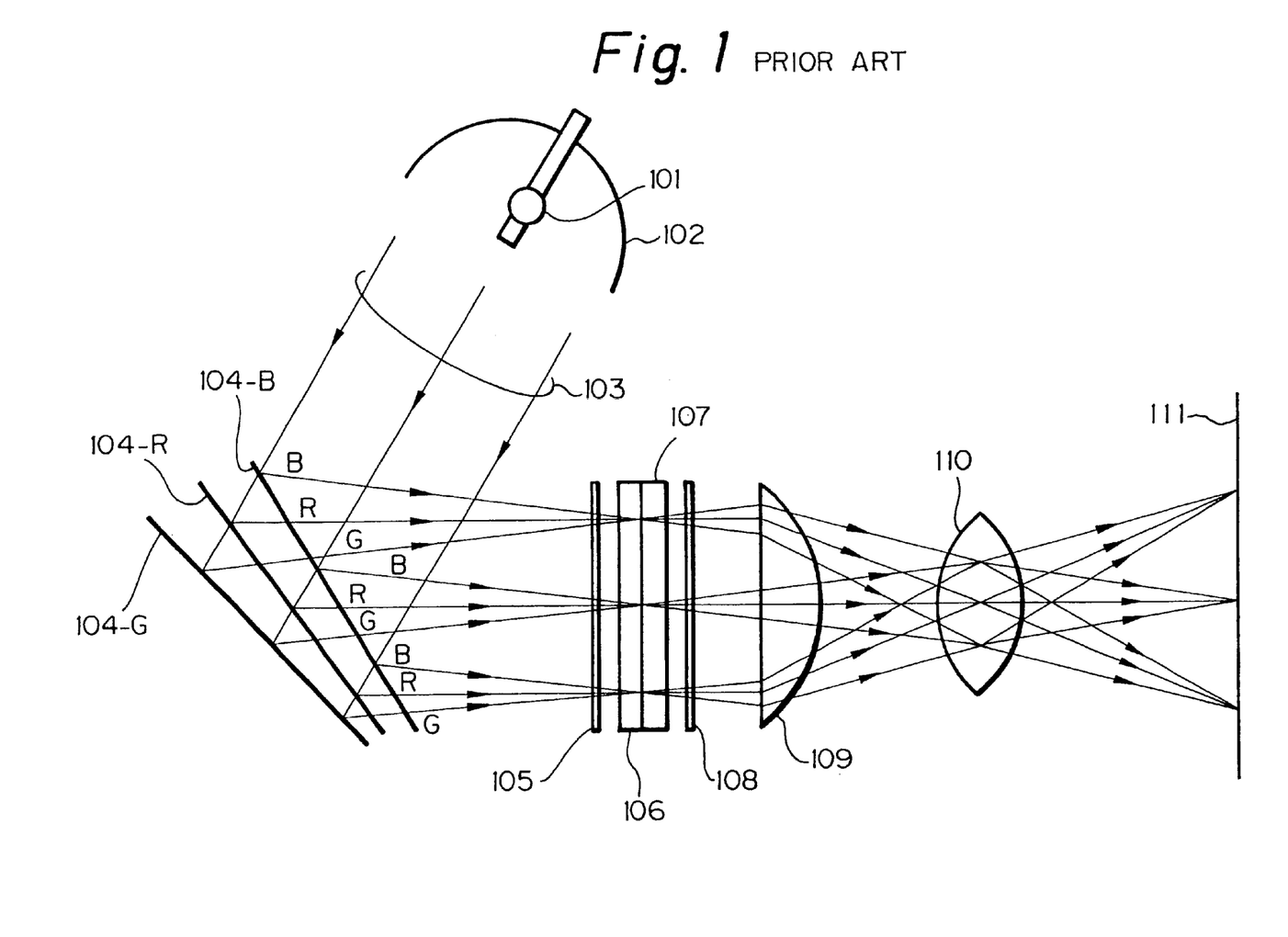
FIG. 1 is a constitutional diagram illustrating a prior art projection type color LCD apparatus.

In FIG. 1, a light source 101 is mounted on a parabolic mirror 102, so that a luminous flux 103 composed of parallel natural light rays is generated therefrom. The luminous flux 103 is incident to dichroic mirrors 104-B, 104-R and 104-G whose angles are different from each other.

The dichroic mirror 104-B reflects blue and transmits red and green therethrough. Also, the dichroic mirror 104-R reflects red and transmits blue and green therethrough. Further, the dichroic mirror 104-G reflects green and transmits green and blue. Thus, the dichroic mirror 104-B reflects a blue luminous flux B, the dichroic mirror 104-R reflects a red luminous flux R, and the dichroic mirror 104-G reflects a green luminous flux G. Then, the blue luminous flux B, the red luminous flux R and the green luminous flux G are incident via a polarization plate 105 as a polarizer to a microlens array 106, an LCD element 107 and a polarization plate 108 as an analyzer.

At the polarization plate 105, from each of the blue luminous flux B, the red luminous flux R and the green luminous flux G is selected linearly-polarized light having a light component only along a specified direction.

Figure 2:
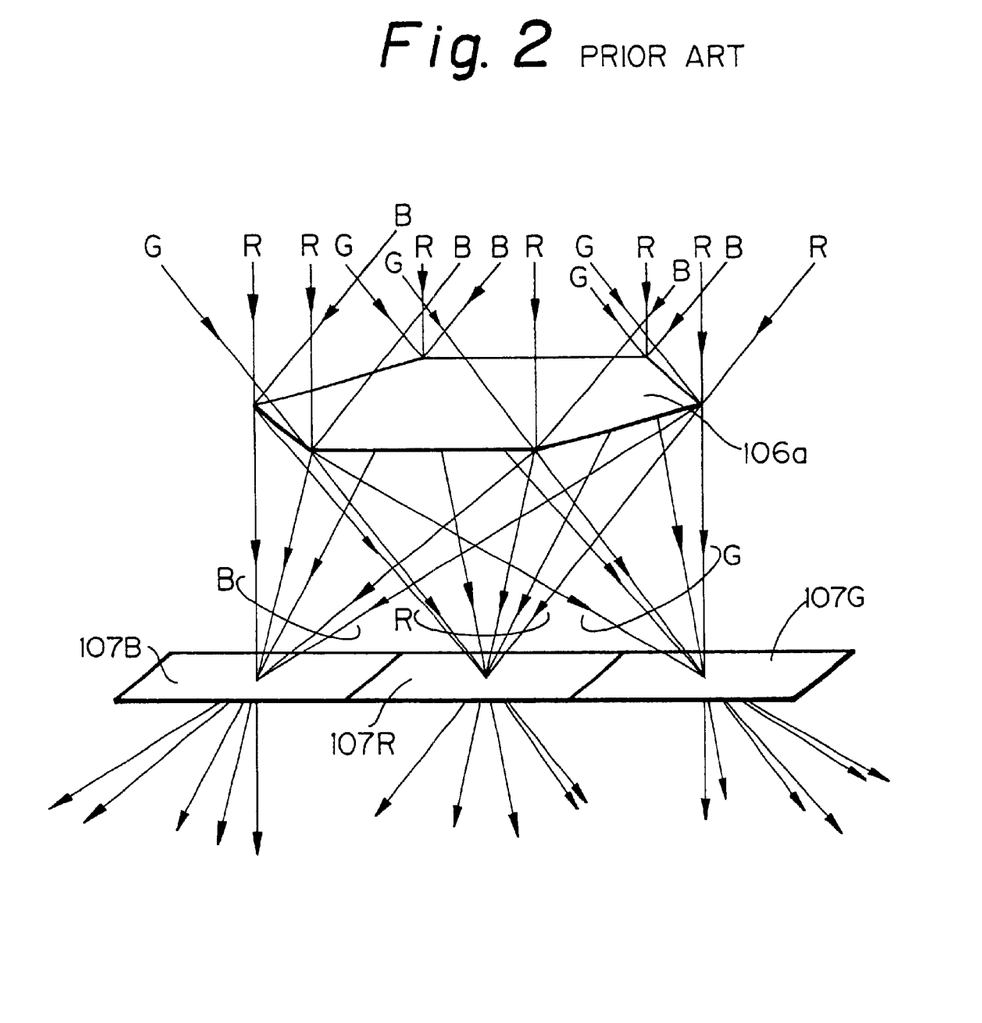
FIG. 2 is an enlarged diagram of the microlens array and the LCD element of FIG. 1.

As illustrated in FIG. 2, since the linearly-polarized blue luminous flux B is incident at a first definite angle to the LCD element 107, this blue luminous flux B incident to one convex lens 106a of the microlens array 106 is incident to one blue pixel 107B of the LCD element 107. Also, since the linearly-polarized red luminous flux R is incident at a second definite angle to the LCD element 107, the red luminous flux R incident to the convex lens 106a of the microlens array 106 is incident to one red pixel 107R of the LCD element 107. Further, since the linearly-polarized green luminous flux G is incident at a third definite angle to the LCD element 107, the green luminous flux G incident to the convex lens 106a of the microlens array 106 is incident to one green pixel 107G of the LCD element 107. Note that the first, second and third definite angles of the linearly-polarized luminous fluxes B, R and G with respect to the microlens array 106 are determined by the angles of the dichroic mirrors 104-B, 104-R and 104-G with respect to the luminous flux 103.

Light passed through the LCD element 107 is incident to a polarization plate 108. Further, light selectively passed through the polarization plate 108 is converged by a field lens 109, and then is scaled up by a projection lens 110. As a result, a color image is obtained on a screen 111. In this case, the projection lens 110 can be reduced in size by the presence of field lens 109.

Thus, in the projection type color LCD apparatus of FIG. 1, since portions of blue, red and green luminous fluxes are selectively incident to the pixels of the LCD element 107, color filters are unnecessary, so that the optical utilization efficiency of light can be increased without the loss of light due to the color filters.

In the projection type color LCD apparatus of FIG. 1, however, natural light is incident to the polarization plate 105, and one of the P-polarized component and the S-polarized component of the natural light is absorbed in the polarization plate 105, so that the optical utilization efficiency of the available light is still low. In addition, since the polarization plate 105 is heated by the absorption of one of the P-polarized component and S-polarized component, the polarization plate 105 is deteriorated. Further, it is difficult to adjust the angles of the dichroic mirrors 104-B, 104-R and 104-G, and also, the adjusted angles of the dichroic mirrors 104-B, 104-R and 104-G are easily deviated from each other by the vibration of the apparatus.

Figure 3:
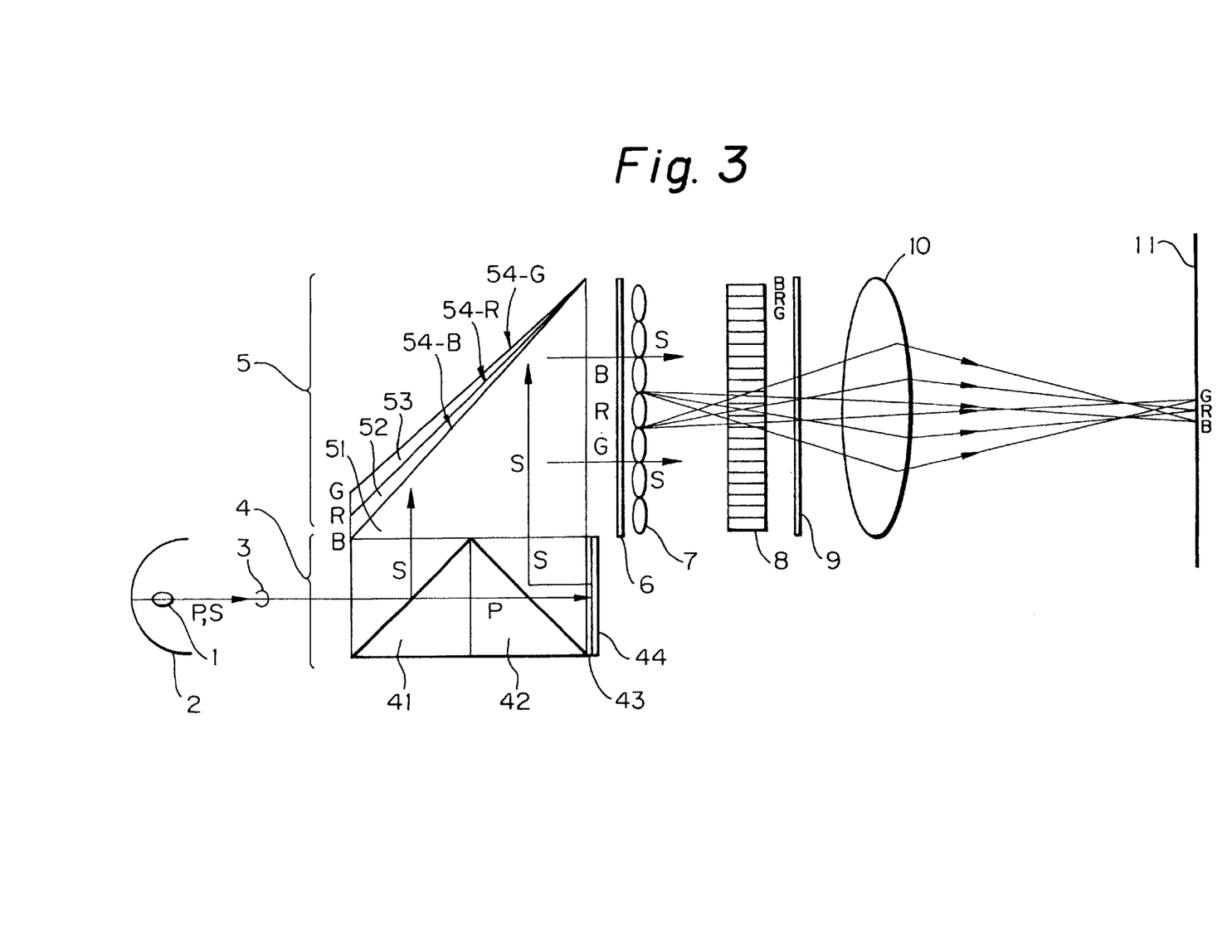
FIG. 3 is a constitutional diagram illustrating a first embodiment of the projection type color LCD apparatus according to the present invention.

In FIG. 3, which illustrates a first embodiment of the present invention, a light source 1 corresponding to the light source 101 of FIG. 1 is mounted on a parabolic mirror 2 corresponding to the parabolic mirror 102 of FIG. 1, so that a luminous flux 3 corresponding to the luminous flux 103 is generated therefrom. The light source 1 can be formed by a 250 W metal halide lamp or a high luminance white light source such as a xenon lamp or a halogen lamp. Also, the inside surface of the parabolic mirror 2 is coated with dielectric multi-layers for absorbing infrared components of natural light generated from the light source 1. In this case, the parabolic mirror 2 can be replaced by a spherical mirror, an elliptical mirror or a non-spherical mirror. Further, a condenser lens can be provided to converge the luminous flux 3, and in addition, an unnecessary component of the converged luminous flux can be eliminated by a slit or a pinhole means.

The luminous flux 3 is incident to a polarization conversion section 4. The polarization conversion section 4 is formed by a polarization beam splitter 41, a polarization beam splitter 42, a optical retardation plate 43 and a mirror 44 in this order from the light source 1. The polarization beam splitter 41 reflects the S-polarized component of the luminous flux 3 and passes the P-polarized component of the luminous flux 3 therethrough. The S-polarized component reflected from the polarization beam splitter 41 is incident to a color separation section 5, and the P-polarized component passed through the polarization beam splitter 41 is incident to the polarization beam splitter 42. Also, the polarization beam splitter 42 passes the P-polarized component passed through the polarization beam splitter 41 to the optical retardation plate 43.

The optical retardation plate 43 is made of uniaxial stretching poly-carbonate which has double refraction characteristics. In this case, the thickness of the optical retardation plate 43 is made so that the difference in phase of light passed therethrough is a quarter wave. Therefore, when the P-polarized component incident to the optical retardation plate 43 is reflected from the mirror 44, thee polarization direction of light is rotated by 90° at the optical retardation plate 43. Therefore, the P-polarized component incident to the optical retardation plate 43 is converted to an S-polarized component. The polarization beam splitter 42 reflects the converted S-polarized component and transmits it to the color separation section 5.

Thus, the polarization conversion section 4 passes the S-polarized component of the luminous flux 3 to the color separation section 5, and also, the polarization conversion section 4 converts the P-polarized component of the luminous flux 3 to an S-polarized. component and passes the converted S-polarized component to the color separation section 5.

The color separation section 5 is mounted on the polarization conversion section 4, and is formed by a triangular type prism 51 on which a wedge type prism 52 is adhered. In addition, a wedge type prism 53 is adhered on the wedge type prism 52.

Figure 4A:
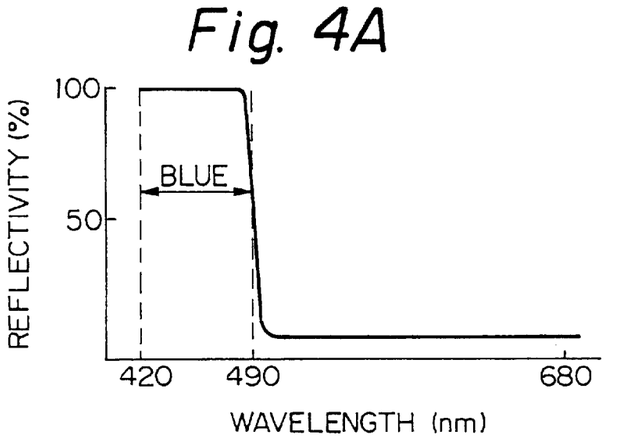
FIGS. 4A, 4B and 4C are graphs showing the reflectivity characteristics of the light reflection layers of FIG. 3 for the S-polarized component of light.
Figure 4B:
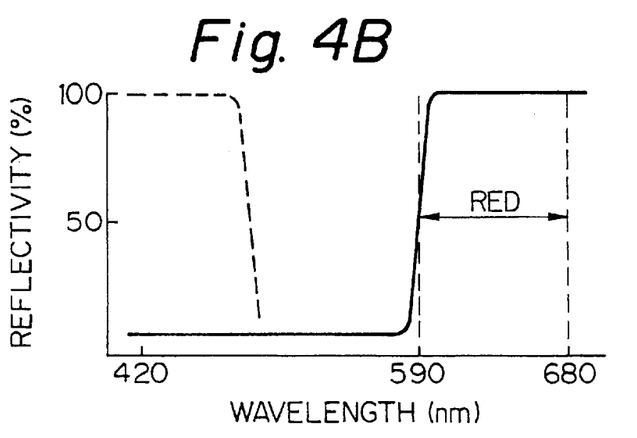
Figure 4C:
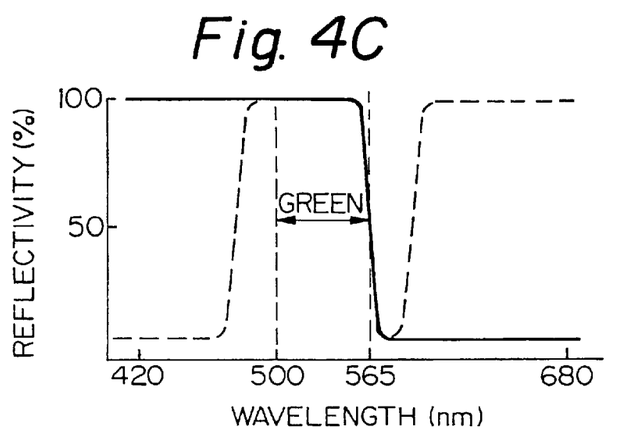

A light reflection layer 54-B is formed between the triangular type prism 51 and the wedge type prism 52, a light reflection layer 54-R is formed between the wedge type prisms 52 and 53, and a light reflection layer 54-G is formed on the wedge type prism 53. The light reflection layers 54-B, 54-R and 54-G are formed by dielectric multi-layers, and have similar characteristics to those of the dichroic mirrors 104-B, 104-R and 104-G, respectively. That is, the light reflection layers 54-B, 54-R and 54-G are at different angles. In addition, the light reflection layer 54-B has a reflectivity characteristic as shown in FIG. 4A where blue light having a wavelength of 420 to 490 nm is selectively reflected and light including green and red passes therethrough. Also, the light reflection layer 54-R has a reflectivity characteristic as shown in FIG. 4B where red light having a wavelength of 590 to 680 nm is selectively reflected and light including blue and green passes therethrough. In this case, however, since the blue light is already reflected by the light reflection layer 54-B, the light reflection layer 54-R may have a reflectivity characteristic for the blue light as indicated by a dotted line in FIG. 4B. Further, the light reflection layer 54-G has a reflectivity characteristic as shown in FIG. 4C where blue and green light having a wavelength of less than 565 nm is selectively reflected and light including red transmits therethrough. In this case, however, since the blue light and the red light are already reflected by the light reflection layers 54-B and 54-R, the light reflection layer 54-G may have a reflectivity characteristic for the blue light and the red light as indicated by a dotted line in FIG. 4C. Note that FIGS. 4A, 4B and 4C show the reflectivity characteristics of the light reflection layers 54-B, 54-R and 54-G for the S-polarized component; however, the reflectivity characteristics of the light reflection layers 54-B, 54-R and 54-G for the P-polarized component are arbitrary.

Thus, in the same way as in the dichroic mirrors 104-B, 104-R and 104-G of FIG. 1, the light reflection layer 54-B reflects a blue luminous flux B, the light reflection layer 54-R reflects a red luminous flux R, and the light reflection layer 54-G reflects a green luminous flux G. Then, the blue luminous flux B, the red luminous flux R and the green luminous flux G are incident; via a polarization plate 6 to a microlens array 7, an LCD element 8 and a polarization plate 9. Note that the polarization plate 6, the microlens array 7, the LCD element 8 and the polarization plate 9 correspond to the polarization plate 105, the microlens array 106, the LCD element 107 and the polarization plate 108, respectively, of FIG. 1.

The microlens array 7 has a plurality of convex lenses each corresponding to three pixels of the LCD clement 8 (see FIG. 2). The microlens array 7 is manufactured by forming a distribution of refractive index using an ion exchange method, or by molding a plastic or glass substrate using a metal mold.

The LCD element 8 is of an active matrix type or a time divisionally driven simple matrix type, where twisted nematic (TN) liquid crystal, super TN liquid crystal, ferroelectric liquid crystal or electrically controlled birefringence liquid crystal is inserted between two glass substrates.

A projection lens 10 enlarges an image of the LCD element 8 and projects it to a screen 11. The projection lens 10 and the screen 11 correspond to the projection lens 110 and the screen 111, respectively, of FIG. 1. In this case, the projection lens 10 has an mechanism for adjusting a focus of an image projected on the screen 11. Note that the field lens 109 of FIG. 1 can also be provided between the polarization plate 9 and the projection lens 10.

In the projection type LCD apparatus of FIG. 3, the S-polarized component; of the luminous flux 3 generated from the light source 1 is reflected by the polarization beam splitter 41, and is incident to the color separation section 5. On the other hand, the P-polarized component of the luminous flux 3 generated from the light source 1 is reflected by the mirror 44 via the optical retardation plate 43, so that this P-polarized component is converted into an S-polarized component. Then, the latter S-polarized component is also incident to the color separation section 5. Thus, the P-polarized component and S-polarized component of the luminous flux 3 are unified into an S-polarized component by the polarization conversion section 4.

A blue component of the unified S-polarized component is reflected by the light reflection layer 54-B and is incident to the polarization plate 6. Also, a red component of the unified S-polarized component is reflected by the light reflection layer 54-R and is incident to the polarization plate 6. Further, a green component of the unified S-polarized component is reflected by the light reflection layer 54-G and is incident to the polarization plate 6. In this case, all the blue, red and green components are S-polarized, i.e., linearly-polarized. Therefore, if the polarization plate 6 is arranged as a polarizer to pass all the blue, red and green components therethrough, all the blue, red and green components are incident at different angles to the microlens array 7. As a result, each convex lens of the microlens array 7 focuses the blue, red and green components on three pixels of the LCD element 8 (see FIG. 2). Then, light passed through the LCD element 8 passes through the polarization plate 9 serving as an analyzer.

In the projection type LCD apparatus of FIG. 3, since the luminous flux 3 is unified into an S-polarized component the loss by the polarization plate 6 is eliminated, which remarkably increases the optical utilization efficiency of the available light. Also, since the polarization plate 6 is hardly heated by the absorption of one of the P-polarized component and the S-polarized component of natural light, the polarization plate 6 is hardly deteriorated. Further, since the light reflection layers 54-B, 54-R and 54-G are fixed to the prisms 51, 52 and 53 which are also fixed to the polarization conversion section 4, it is unnecessary to adjust the angles of the light reflection layers 54-S, 54-R and 54-G, and also, the angles of the light reflection layers 54-B, 54-R and 54-G are hardly deviated from their optimum locations by the vibration of the apparatus.

Figure 5:
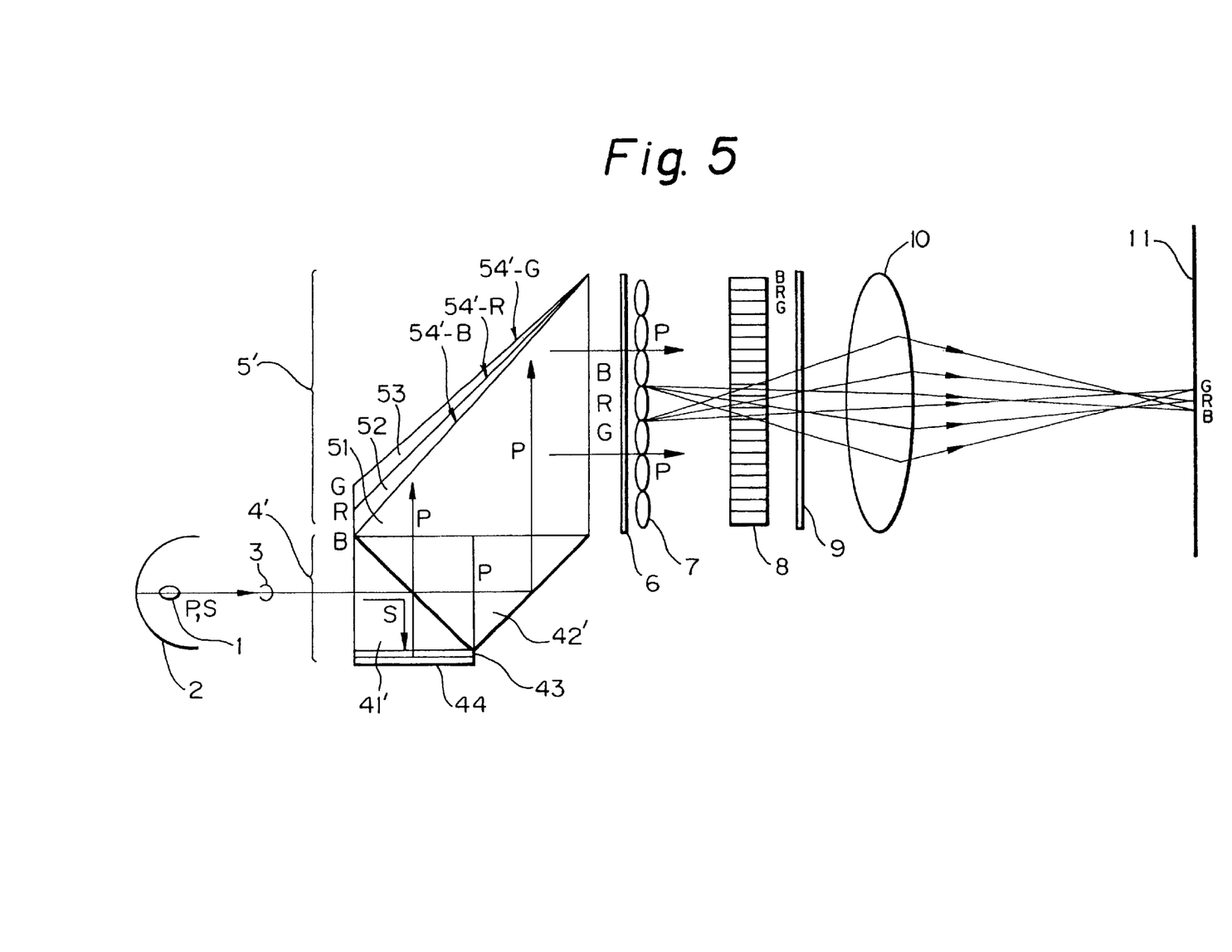
FIG. 5 is a constitutional diagram illustrating a second embodiment of the projection type color LCD apparatus according to the present invention.

In FIG. 5, which illustrates a second embodiment of the present invention, the polarization conversion section 4 of FIG. 3 is replaced by a polarization conversion section 4' which includes a polarization beam splitter 41' and a right angle prism 42' instead of the polarization beam splitters 41 and 42 of FIG. 3. Also, the optical retardation plate 43 and She mirror 44 are adhered to the polarization beam splitter 41', riot to the right angle prism 42'. That is, the polarization beam splitter 41' reflects the s-polarized component of the luminous flux 3 and passes the P-polarized component of the luminous flux 3 therethrough. The S-polarized component reflected from the polarization beam splitter 41' is incident to the optical retardation plate 43, and the P-polarized component passed through the polarization beam splitter 41' is incident to the right angle prism 42'. Also, the right angle prism 42' reflects the P-polarized component passed through the polarization beam splitter 41' to a color separation section 5'.

On the other hand, when the S-polarized component incident to the optical retardation plate 43 is reflected from the mirror 44, the polarization direction of light is rotated by 90° at the optical retardation plate 43. Therefore, the S-polarized component incident to the optical retardation plate 43 is converted to a P-polarized component which is transmitted to the color separation section 5'.

Thus, the polarization conversion section 49 passes the P-polarized component of the luminous flux 3 to the color separation section 5', and also, the polarization conversion section 4' converts the S-polarized component of the luminous flux 3 to a P-polarized component and passes the converted P-polarized component to the color separation section 5'.

The color separation section 5' includes light reflection layers 54'-B, 54'-R and 54'-G instead of the light reflection layers 54-B, 54-R and 54-G, respectively, of FIG. 3. The reflectivity characteristics of the light reflection layers 54'-B, 54'-R and 54'-G for the P-polarized component are similar to those of the light reflection layers 54-B, 54-R and 54-G for the S-polarized component as shown in FIGS. 4A, 4B and 4C, respectively. In this case, note that the reflectivity characteristics of the light reflection layers 54'-B, 54'-F and 54'-G for the S-polarized component are arbitrary.

Thus, in the same way as in the dichroic mirrors 104-B, 104-R and 104-G of FIG. 1, the light reflection layer 54'-B reflects a blue luminous flux B, the light reflection layer 54'-R reflects a red luminous flux R, and the light reflection layer 54'-G reflects a green luminous flux G. Then, the blue luminous flux B, the red luminous flux R and the green luminous flux G are incident via the polarization plate 6 to the microlens array 7, the LCD element 8 and the polarization plate 9.

In the projection type LCD apparatus of FIG. 5, the P-polarized component of the luminous flux 3 generated from the light source 1 is reflected by the right angle prism 42', and is incident to the color separation section 5'. On the other hand, the S-polarized component of the luminous flux 3 generated from the light source 1 is reflected by the mirror 44 via the optical retardation plate 43, so that this S-polarized component is converted into a P-polarized component. Then, the latter P-polarized component is also incident to the color separation section 5'. Thus, the P-polarized component and S-polarized component of the luminous flux 3 are unified into a P-polarized component by the polarization conversion section 4'.

A blue component of the unified P-polarized component is reflected by the light reflection layer 54'-B and is incident to the polarization plate 6. Also, a red component of the unified P-polarized component is reflected by the light reflection layer 54'-R and is incident to the polarization plate 6. Further, a green component of the unified P-polarized component is reflected by the light reflection layer 54'-G and is incident to the polarization plate 6. In this case, all the blue, red and green components are P-polarized, i.e., linearly-polarized. Therefore, if the polarization plate 6 is arranged as a polarizer to pass all the blue, red and green components therethrough, all the blue, red and green components are incident at different angles to the microlens array 7. As a result, each convex lens of the microlens array 7 focuses the blue, red and green components on three pixels of the LCD element 8 (see FIG. 2). Then, light passed through the LCD element 8 passes through the polarization plate 9 serving as an analyzer.

Even in the projection type LCD apparatus of FIG. 5, since the luminous flux 3 is unified into a P-polarized component, the loss by the polarization plate 6 is eliminated, which remarkably increases the optical utilization efficiency of the available light. Also, since the polarization plate 6 is hardly heated by the absorption of one of the P-polarized component and the S-polarized component of natural light, the polarization plate 6 is hardly deteriorated. Further, since the light reflection layers 54'-B, 54'-R and 54'-G are fixed to the prisms 51, 52 and 53 which are also fixed to the polarization conversion section 4', it is unnecessary to adjust the angles of the light reflection layers 54'-B, 54'-R and 54'-G, and also, the angles of the light reflection layers 54'-B, 54'-R and 54'-G are hardly deviated from their optimum locations by the vibration of the apparatus.

Figure 6:
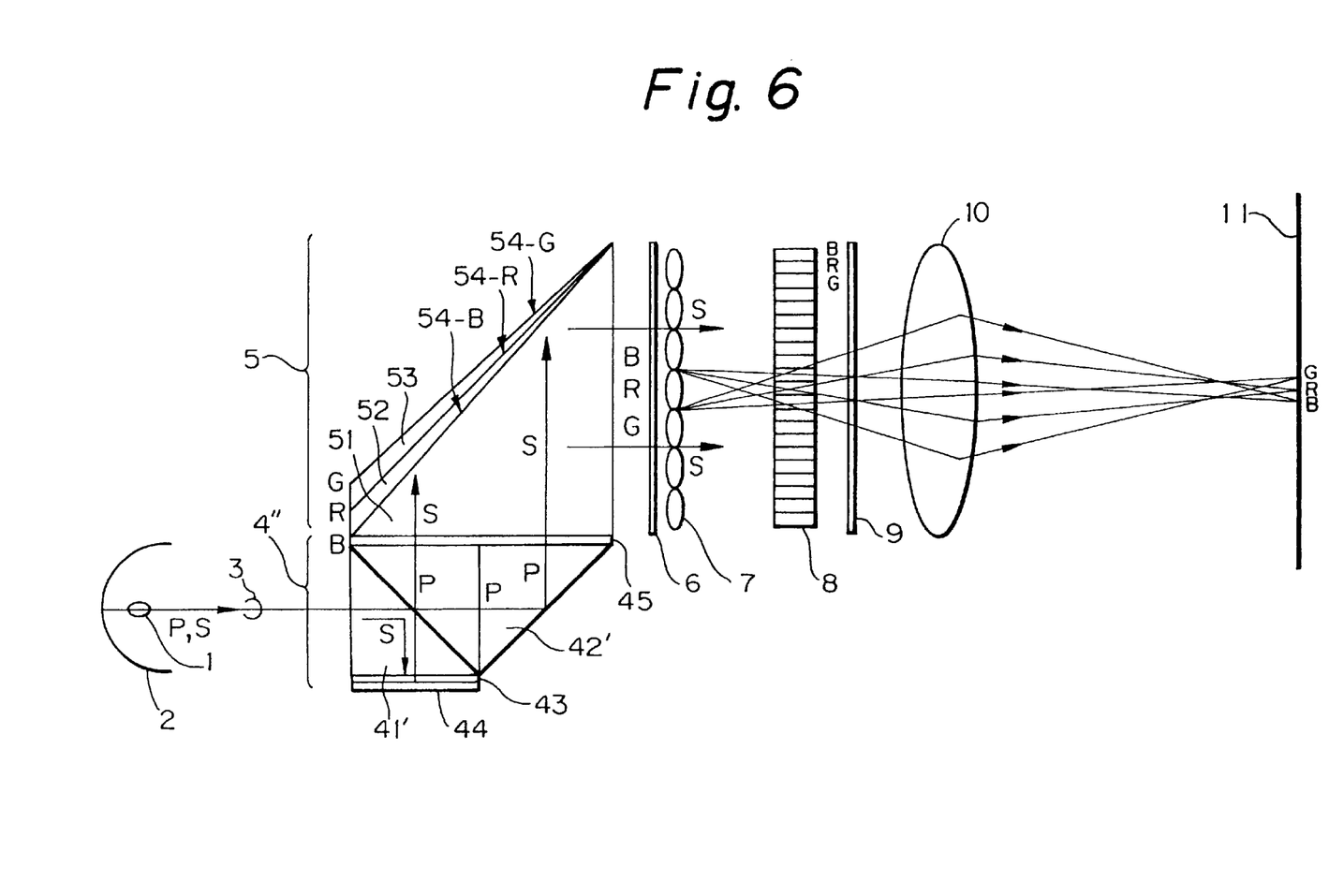
FIG. 6 is a constitutional diagram illustrating a third embodiment of the projection type color LCD apparatus according to the present invention.

In FIG. 6, which illustrates a third embodiment of the present invention, a polarization conversion section 4" has a optical retardation plate 45 in addition to the polarization conversion section 4' of FIG. 5. The optical retardation plate 45 has the same characteristics as the optical retardation plate 43. That is, the polarization beam splitter 41' reflects the S-polarized component of the luminous flux 3 and passes the P-polarized polarized component of the luminous flux 3 therethrough. The S-polarized component reelected from the polarization beam splitter 41' is incident to the optical retardation plate 43, and the P-polarized component passed through the polarization bean splitter 41' is incident to the right angle prism 42'. Also, the right angle prism 42' reflects the P-polarized component passed through the polarization beam splitter 41' to the optical retardation plate 45.

On the other hand, when the S-polarized component incident to the optical retardation plate 43 is reflected from the mirror 44, the polarization direction of light is rotated by 90° at the optical retardation plate 43. Therefore, the S-polarized component incident to the optical retardation plate 43 is converted to a P-polarized component which is transmitted to the optical retardation plate 45.

Thus, the polarization conversion section 4" passes the P-polarized component of the luminous flux 3 to the optical retardation plate 45 of the polarization conversion section 4", and also, the polarization conversion section 4" converts the S-polarized component of the luminous flux 3 to a P-polarized component and passes the converted P-polarized component to the optical retardation plate 45 of the polarization conversion section 4".

In the optical retardation plate 45, all the P-polarized components passed through the polarization beam splitter 41' and the right angle prism 42' are converted into an S-polarized component.

The color separation section 5 includes the light reflection layers 54-B, 54-R and 54-G, whose reflectivity characteristics for the S-polarized component are shown in FIGS. 4A, 4B and 4C, respectively. In this case, note that the reflectivity characteristics of the light reflection layers 54-B, 54-R and 54-G for the P-polarized component are arbitrary.

Thus, in the same way as in the dichroic mirrors 104-B, 104-R and 104-G of FIG. 1, the light reflection layer 54-B reflects a blue luminous flux B, the light reflection layer 54-R reflects a red luminous flux R, and the light reflection layer 54-C reflects a green luminous flux G. Then, the blue luminous flux B, the red luminous flux R and the green luminous flux G are incident via the polarization plate 6 to the microlens array 7, the LCD element 8 and the polarization plate 9.

In the projection type LCD apparatus of FIG. 6, the P-polarized component of the luminous flux 3 generated from the light source 1 is reflected by the right angle prism 42', and is incident to the color separation section 5 after the conversion of the P-polarized component to its corresponding S-polarized component. On the other hand, the S-polarized component of the luminous flux 3 generated from the light source 1 is reflected by the mirror 44 via the optical retardation plate 43, so that this S-polarized component is converted into a P-polarized component. Then, the latter P-polarized component is also incident to the color separation section 5 after the conversion of the P-polarized component to its corresponding S-polarized component. Thus, the P-polarized component and S-polarized component of the luminous flux 3 are unified into an S-polarized component by the polarization conversion section 4".

A blue component of the unified S-polarized component is reflected by the light reflection layer 54-B and is incident to the polarization plate 6. Also, a red component of the unified S-polarized component is reflected by the light reflection layer 54-R and is incident to the polarization plate 6. Further, a green component of the unified s-polarized component is reflected by the light reflection layer 54-G and is incident to the polarization plate 6. In this case, all the blue, red and green components are S-polarized, i.e., linearly-polarized. Therefore, if the polarization plate 6 is arranged as a polarizer to pass all the blue, red and green components therethrough, all the blue, red and green components are incident at different angles to the microlens array 7. As a result, each convex lens of the microlens array 7 focuses the blue, red and green components on three pixels of the LCD element 8 (see FIG. 2). Then, light passed through the LCD element 8 passes through the polarization plate 9 serving as an analyzer.

Even in the projection type LCD apparatus of FIG. 6, since the luminous flux 3 is unified into an S-polarized component, the loss by the polarization plate 6 is eliminated, which remarkably increases the optical utilization efficiency of the available light. Also, since the polarization plate 6 is hardly heated by the absorption of one of the P-polarized component and the S-polarized component of natural light, the polarization plate 6 is hardly deteriorated. Further, since the light reflection layers 54-3, 54-R and 54-G are fixed to the prisms 51, 52 and 53 which are also fixed to the polarization conversion section 4'', it is unnecessary to adjust the angles of the light reflection layers 54-B, 54R and 54-G, and also, the angles of the light reflection layers 54-B, 54-R and 54-G are hardly deviated from their optimum locations by the vibration of the apparatus.

In the projection type LCD apparatus of FIG. 3, the difference in optical path length between the light source 1 and the screen 1.1 is not equal, so that the chromaticity and brightness distribution on the screen 11 is not homogenous. On the other hand, in the projection type LCD apparatuses of FIGS. 5 and 6, the difference in optical path length between the light source 1 and the screen 11 is homogenous, so that the chromaticity and brightness distribution on the screen 11 is homogenous.

Figure 7:
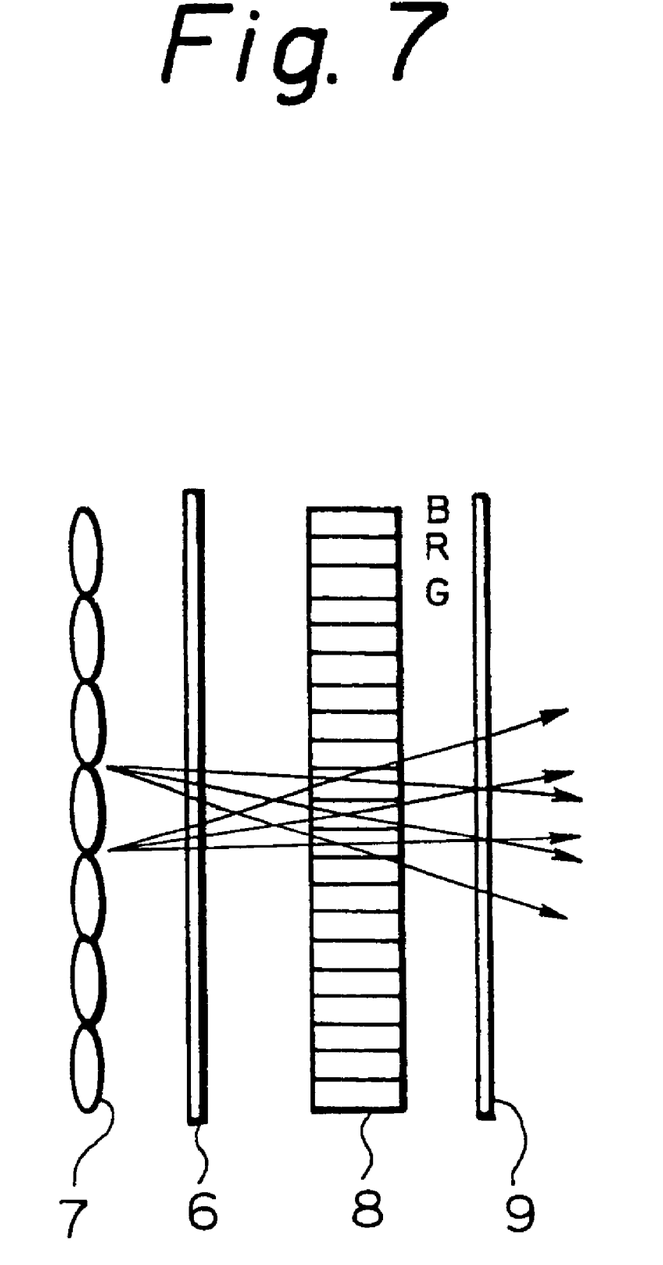
FIG. 7 is a diagram of a modification of an arrangement of the microlens array of FIGS. 3, 5 and 6.

In FIGS. 3, 5 and 6, the microlens array 7 is incorporated into an. assembly of the LCD element 8 combined with the polarization plates 6 and 9. However, the microlens array 7 can be interposed between the color separation section 5 (5') and the polarization plate 6 as illustrated in FIG. 7; in this case, the microlens array 7 can be separated from the polarization plate 6.

As explained hereinabove, according to the present invention, the optical utilization efficiency of the available light can be enhanced. Also, the deterioration of the polarization plate (polarizer) can be suppressed. Further, the LCD apparatus according to the present invention is vibration-proof.

What is claimed is:

1. A projection type color liquid crystal display apparatus comprising:
   a light source for generating a luminous flux;
   a polarization conversion section for receiving said luminous flux to convert said luminous flux into a unified luminous flux having a same linearly-polarized light component reflected in a same direction;
   a color separation section mounted on said polarization conversion section for receiving said unified luminous flux to selectively reflect a plurality of color components of said unified luminous flux individually, said color separation section having at least two light reflection layers at different angles;
   a microlens array including a plurality of convex lenses, each receiving reflected color components; and
   a liquid crystal display means receiving said reflected color components and including liquid crystal display elements sandwiched by first and second polarization plates, each of said convex lenses converging said reflected color components into different pixels of said liquid crystal element;
   wherein said polarization conversion section comprises:
      a polarization beam splitter for receiving said luminous flux to reflect an S-polarized component of said luminous flux and pass a P-polarized component of said luminous flux therethrough;
      a right angle prism for receiving the P-polarized component of said luminous flux from said polarization beam splitter to reflect the P-polarized component of said luminous flux, the P-polarized component of said luminous flux being transmitted to said color separation section; and
      an optical retardation plate and a mirror for receiving the S-polarized component of said luminous flux from said polarization beam splitter, so that the S-polarized component of said luminous flux is converted into a P-polarized component of said luminous flux,
      said polarization beam splitter passing the converted P-polarized component of said luminous flux and transmitting the converted P-polarized component of said luminous flux to said color separation section,
      said unified luminous flux being formed by the P-polarized component of said luminous flux and the converted P-polarized component of said luminous flux.

2. A projection type color liquid crystal display apparatus comprising:
   a light source for generating a luminous flux;
   a polarization conversion section for receiving said luminous flux to convert said luminous flux into a unified luminous flux having a same linearly-polarized light component reflected in a same direction;
   a color separation section mounted on said polarization conversion section for receiving said unified luminous flux to selectively reflect a plurality of color components of said unified luminous flux individually, said color separation section having at least two light reflection layers at different angles;
   a microlens array including a plurality of convex lenses, each receiving reflected color components; and
   a liquid crystal display means receiving said reflected color components and including liquid crystal display elements sandwiched by first and second polarization plates, each of said convex lenses converging said reflected color components into different pixels of said liquid crystal element;
   wherein said polarization conversion section comprises:
      a polarization beam splitter for receiving said luminous flux to reflect an S-polarized component of said luminous flux and pass a P-polarized component of said luminous flux therethrough;
      a right angle prism for receiving the P-polarized component of said luminous flux from said polarization beam splitter to reflect the P-polarized component of said luminous flux, the P-polarized component of said luminous flux being transmitted to said color separation section; and
      a first optical retardation plate and a mirror for receiving the S-polarized component of said luminous flux from said polarization beam splitter, so that the S-polarized component of said luminous flux is converted into a P-polarized component of said luminous flux,
      a second optical retardation plate for receiving said unified luminous flux to convert the P-polarized component of said unified luminous flux into an S-polarized component of said unified luminous flux,
      said polarization beam splitter passing the converted P-polarized component of said luminous flux and transmitting the converted P-polarized component of said luminous flux to said color separation section, said unified luminous flux being formed by the P-polarized component of said luminous flux and the converted P-polarized component of said luminous flux.

3. A projection type color liquid crystal display apparatus comprising:

a light source for generating a luminous flux;

a polarization conversion section for receiving said luminous flux to convert said luminous flux into a unified luminous flux having a same linearly-polarized light component reflected in a same direction;

a color separation section mounted on said polarization conversion section for receiving said unified luminous flux to selectively reflect a plurality of blue, red and green components of said unified luminous flux individually, said color separation section having at least two light reflection layers at different angles;

a microlens array including a plurality of convex lenses, each receiving reflected blue, red and green components; and a liquid crystal display means receiving said reflected color components and including a liquid crystal display element sandwiched by first and second polarization plates, each of said convex lenses converging said reflected blue, red and green components into different pixels of said liquid crystal element, said polarization conversion section comprising:

a polarization beam splitter for receiving said luminous flux to reflect an S-polarized component of said luminous flux and pass a P-polarized component of said luminous flux therethrough;

a right angle prism for receiving the P-polarized component of said luminous flux from said polarization beam splitter to reflect the P-polarized component of said luminous flux, the P-polarized component of said luminous flux being transmitted to said color separation section; and a first optical retardation plate and a mirror for receiving the S-polarized component of said luminous flux from said polarization bean splitter, so that the S-polarized component of said luminous flux is converted into a P-polarized component of said luminous flux, said polarization beam splitter passing the converted P-polarized component of said luminous flux and transmitting the converted P-polarized component of said luminous flux to said color separation section, said unified luminous flux being formed by the P-polarized component of said luminous flux and the converted P-polarized component of said luminous flux;

said color separation section comprising:

a triangle type prism having a sloped surface;

a first wedge-type prism mounted on the sloped surface of said triangular type prism;

a second wedge-type prism mounted on said first wedge-type prism;

a first light reflection layer, formed between said triangle type prism and said first wedge-type prism, for selectively reflecting a blue component of said unified luminous flux;

a second light reflection layer, formed between said first and second wedge-type prisms, for selectively reflecting a red component of said unified luminous flux; and a third light reflection layer, formed on said second wedge-type prism, for selectively reflecting a green component of said unified luminous flux.

4. The apparatus set forth in claim 3, wherein said polarization conversion section further comprises a second optical retardation plate for receiving said unified luminous flux to convert the P-polarized component of said unified luminous flux into an S-polarized component of said unified luminous flux.

* * * * *